United States Patent
Graham, Jr. et al.

(10) Patent No.: US 7,415,674 B1
(45) Date of Patent: Aug. 19, 2008

(54) METHOD AND SYSTEM FOR EDITING AN ELECTRONIC DRAWING

(75) Inventors: Cecil Alba Graham, Jr., Lenexa, KS (US); Liang Jin, Overland Park, KS (US); William Edward Johnson, Menomonee Falls, WI (US)

(73) Assignee: Sprint Communications Company L.P., Overland Park, KS (US)

( * ) Notice: Subject to any disclaimer, the term of this patent is extended or adjusted under 35 U.S.C. 154(b) by 879 days.

(21) Appl. No.: 10/395,535

(22) Filed: Mar. 24, 2003

(51) Int. Cl.
*G06K 15/00* (2006.01)
(52) U.S. Cl. .................................. 715/765; 715/964
(58) Field of Classification Search ......... 715/744–747, 715/730–732, 738–739, 750–755, 759, 765, 715/771, 964, 705–708; 345/629, 660
See application file for complete search history.

(56) References Cited

U.S. PATENT DOCUMENTS

| | | | | |
|---|---|---|---|---|
| 6,154,600 | A * | 11/2000 | Newman et al. ............... 386/4 |
| 6,622,149 | B1 * | 9/2003 | Kellstrom, Jr. ........... 707/104.1 |
| 6,944,513 | B1 * | 9/2005 | Tomomitsu et al. ........... 700/98 |
| 2003/0149498 | A1 * | 8/2003 | Rebello et al. ................ 700/97 |
| 2003/0193512 | A1 * | 10/2003 | Komagata .................... 345/629 |
| 2003/0214528 | A1 * | 11/2003 | Pierce et al. ................. 345/723 |
| 2004/0128613 | A1 * | 7/2004 | Sinisi ......................... 715/500 |
| 2004/0172191 | A1 * | 9/2004 | Vitikainen et al. .......... 701/208 |
| 2004/0221232 | A1 * | 11/2004 | Morgan ...................... 715/530 |
| 2005/0125204 | A1 * | 6/2005 | Garcia et al. ................... 703/1 |

* cited by examiner

*Primary Examiner*—Steven P. Sax

(57) ABSTRACT

A method, system, and medium for editing electronic drawings or drafting documents are provided. The method includes presenting a representation of an electronic drawing, including a version of the drawing itself, to be edited, receiving edits to the representation, and storing the edits in a file that is separate from the electronic drawing. The edits are not initially made directly to the drawing. Rather, the edits are received distinct from the drawing and later made to the drawing by a central authority.

20 Claims, 3 Drawing Sheets

METHOD AND SYSTEM FOR EDITING AN ELECTRONIC DRAWING

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer programming and automated drafting. More particularly, the present invention provides a new and useful method for preserving an original electronic drawing while electronically marking up the drawing for editing.

BACKGROUND OF THE INVENTION

Drawings have been used for centuries to simplify the transformation of natural resources into desired devices, components, and structures. Historically, drawings were created by draftspersons using pencil and paper. Drawings could also be inked. Improvements came over time and eventually paper drawings were transferable onto more durable media such as Mylar film. With the rise of computers, computer aided design (CAD) became commonplace. Today computers are used to assist drafting throughout almost every industry, from aircraft manufacturing to missile design to telecommunications implementations, but editing these drawings has remained difficult.

As CAD programs evolved, they became highly complex. High demands for accuracy and increased functionality make CAD programs difficult to use. One reason why it is desirable to have a single group or entity make changes to drawings is because CAD software applications are difficult to use. Version control is another reason, as is resolving the difficulty of keeping those who make changes aware of standardizations used in drawings. Version control refers to the process by which changes are implemented chronologically. When a company needs to make changes to drawings, those changes need to be implemented in a timely and efficient manner. Although some situations in a development environment lend themselves to public or unmonitored modifications, most environments contemplate a single source of draftspersons to implement changes to drawings.

One method of implementing changes to drawings includes first acquiring a hard copy, or printed version, of the drawing. That hard copy is manually marked up according to the desired changes. To mark up a drawing is to designate edits to be made. This hard copy, marked-up version must then be mailed or sent to a drafting department. The drafting department receives the drawing (typically through a mail system) and reviews the changes. If the draftsperson is able to understand what changes need to be made, these changes are made and confirmation is then returned to the person who requested the changes. This method for updating drawings can easily exceed a month to complete.

There are several problems associated with manual retrieval and manual mark-ups. During the lag period of a month or so, additional changes may be erroneously attempted to be made to the drawing by other individuals. For instance, in a telecommunications environment, drawings are used to delineate where specific equipment is located. This equipment is used to facilitate data and voice transmissions across a telecommunications network. If a first engineer needed to make a change to a first drawing, [s]he must wait thirty or forty days until those changes are made and communicated back to him or her. There is a possibility that a second engineer may attempt to modify the same first drawing before the first engineer's changes are actually implemented in the drawing(s). Such an inefficient process wastes resources, increases implementation time, and increases expense.

An improved method includes centralizing all drawings in a network storage device. These drawings can then be accessed via a network but still must be printed and physically marked up in order to have changes implemented. Centralizing the drawings and making them more accessible can reduce the lag time from start to finish to within a few days. But even a few days can translate into an unacceptable wait in today's work environments. Projects may have to wait and cannot be worked on until drawings are updated. The longer it takes drawings to be updated, the longer the process extends to complete a given project. Moreover, the problems associated with manually marked up drawings persist.

When a drawing is manually marked up, the draftsperson is left at the mercy of the marker to clearly communicate the desired changes. Sometimes marking guidelines are created—albeit not always followed—to help make changes clear. For instance, an exemplary guideline may be to mark additions in green and deletions in yellow. But what if a fledgling engineer marks an addition in yellow? The draftsperson must attempt to contact or send the drawing back to the engineer for clarification, delaying time to completion and increasing the likelihood that someone else may rely on an outdated drawing.

A potential alternative to extended lag times would be to permit individuals who desire changes to be made ("markers") to actually make the changes to a specific drawing. However, such a solution would require that all markers possess the specialized knowledge associated with computer-drafting applications as well as a knowledge of drawing standards applicable to a specific environment. Such cross-functionality is uncommon in today's workplace.

A field technician, analyst, patent prosecutor, engineer or the like may understand how to develop, construct and implement certain technologies but may not have any skill relating to computer-aided drafting, nor of the specific ways to actually implement desired changes. That is, certain lines may need to have certain widths, arrows may need to be open or closed, certain changes may need to be made in a certain color. The list of business or development requirements in the myriad of applicable scenarios is almost endless. The engineer may not know how to actually select a line width, arrowhead, color, etcetera. Such knowledge is beyond his/her required skill set.

Moreover, resources would need to be expended to train anyone who may desire to change a drawing. This method is an inefficient use of resources. The person desiring to make a change would have to be familiar with all accepted internal or external drafting codes and standards. It is more resourceful to have a dedicated group of individuals making changes who are intimately familiar with the CAD software applications, drafting codes, and standards.

Therefore, there is a need for a method and system of denoting changes to an existing drawing while preserving the actual drawing until the changes can be implemented. There is a need to enable an individual who wishes to make changes to a drawing to be able to denote such a change clearly on a drawing and have that change implemented more quickly than is possible today given the current state of the art.

SUMMARY OF THE INVENTION

The present invention solves at least the above problems by providing a system and method for marking edits on a drawing without actually affecting the underlying drawing and then communicating those changes in a paperless environment. The present invention has several practical applications in the technical arts including reducing the time, effort, and resources associated with marking up and editing drawings; increasing the accessibility of drawings to a global scale via the Internet and a Web interface; and decreasing errors associated with marking up drawings. The present invention provides visibility to the drawing to be edited, stores the changes to be made to the drawing separate from the drawing itself, and associates those changes with the drawing.

Thus in one aspect of the invention a method is provided for editing an electronic drawing. The method includes presenting a representation of the drawing, superimposing edits onto the representation of the drawing, and then saving the edits in a file separate from the electronic drawing. These edits can then be used to actually change the underlying drawing when desired. As will be explained below with respect to a preferred embodiment, the drawing representation can be a read-only version of the actual drawing and edits are made to a designated markup layer of the drawing representation.

In another aspect of the invention, a computer-readable medium is provided having computer-useable instructions that enable a computer system to provide for the marking up of a drawing without affecting the underlying drawing. Instructions are included for completing the entire process, including communicating the changes to be made to a draftsperson, in a paperless environment.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
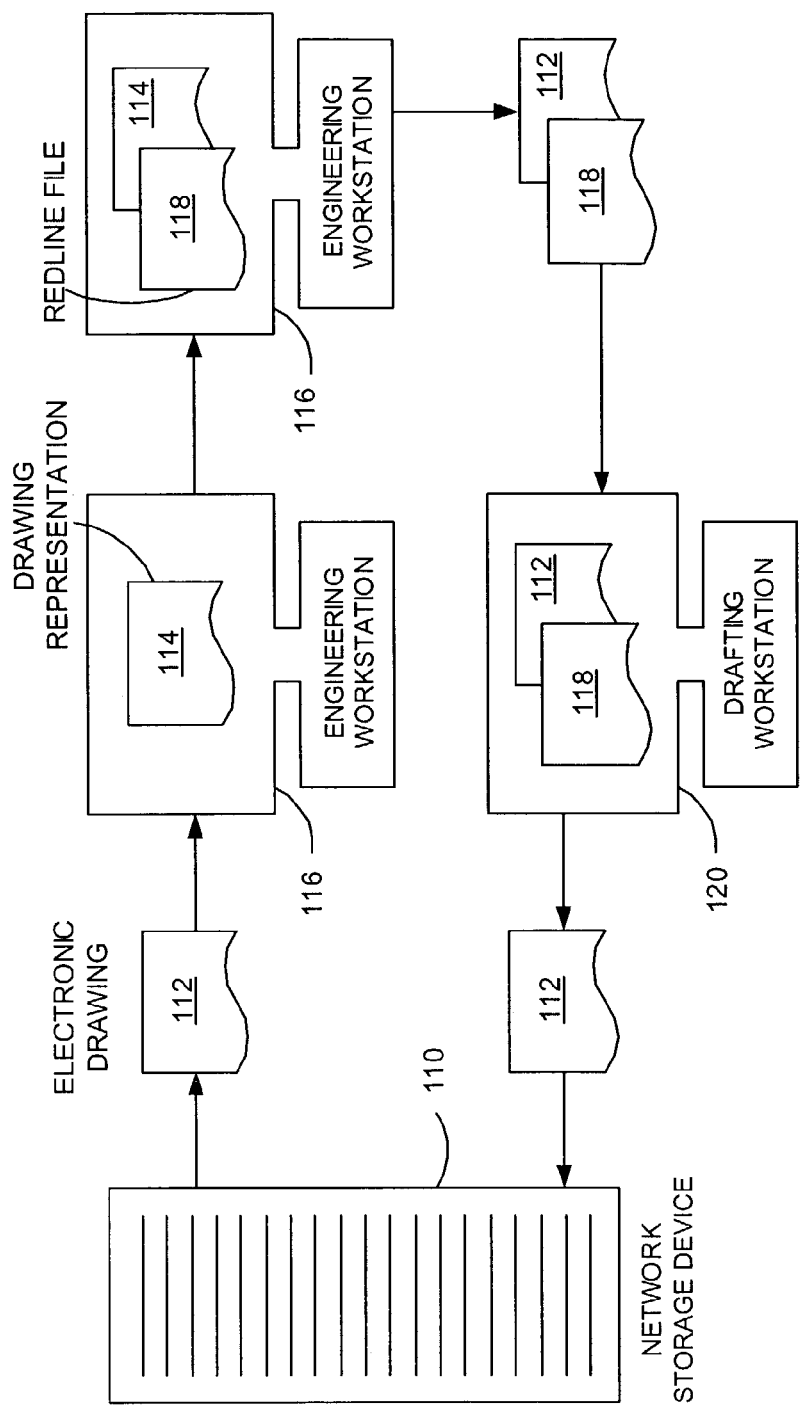
FIG. 1 is a block diagram depicting a suitable operating environment for practicing the present invention.

The present invention provides an improved method and system for editing electronic documents. As one skilled in the art will appreciate, the present invention may be embodied as, among other things: a method, a medium, or a computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a computer, database, hand-held device, etc. Computers are conventional in nature, having several busses coupling memory and storage units to one or more processes and input/output devices. By way of example, and not limitation, computer-readable media, in which electronic drawings can be stored, comprise computer-storage media and communications media.

Computer-storage media, or machine-readable media, include media implemented in any method or technology for storing information. Examples of stored information include computer-useable instructions, data structures, program modules, data segments, schema, functions, and other data representations. Computer-storage media include, but are not limited to RAM, ROM, EEPROM, flash memory or other memory technology, CAROM, digital versatile disks (DVD), a carrier wave, holographic media or other optical disk storage, magnetic cassettes, magnetic tape, magnetic-disk storage, and other magnetic-storage devices. These memory components can store data momentarily, temporarily, or permanently on both volatile and nonvolatile memory.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless-media technologies. Combinations of the above are included within the scope of computer-readable media.

As previously mentioned, the present invention is a tool that, among other things, simplifies marking-up or as the term is used in the art, "redlining" drawings while preserving the drawing until the edits can be incorporated therein.

FIG. 1 illustrates an exemplary operating environment and method for practicing the present invention. All details such as networks and network connections are not included in FIG. 1 due to their conventional nature. Electronic drawings are stored in a network storage device 110. Network storage device 110 is conventional in nature and can be one or more devices that store electronic drawings. Network storage device 110 does not need to be connected to a network per se, but can be any device including a conventional computer, that stores data, such as an electronic drawing 112.

Electronic drawing 112 can be any type of drawing embodied in digital format. Exemplary drawings include schematic drawings, construction plans, network drawings, equipment-placement diagrams, architectural diagrams, alarm diagrams, fiber optic diagrams, flow diagrams, and more. CAD applications also abound. In a preferred embodiment, the present invention is used to modify CAD drawings made using one of the many flavors of AUTOCAD®, a software application offered by Autodesk, Inc., of San Rafael, Calif. Those skilled in the art, however, will appreciate that the present invention could be used to edit virtually any type of electronic drawing or digital image, including pictures, made with virtually any software application.

Electronic drawing 112 is used to present a drawing representation 114 of electronic drawing 112 on an engineering workstation 116. The present invention presents representation 114 of electronic drawing 112 on engineering workstation 116. The drawing representation 114 can assume a variety of forms. For instance, drawing representation 114 may be a read-only version of electronic drawing 112, an image of electronic drawing 112, or some other depiction of electronic drawing 112. Accordingly, drawing representation 114 could include that drawing to be edited.

The present invention allows an engineer, or other user, to access the electronic drawings stored in network storage device 110. When a user desires to make a change to electronic drawing 112 he or she is presented with the drawing representation 114. A redline file 118 is simultaneously created in the foreground. The redline file 118 can be any file that stores the changes to be made to electronic drawing 112. The changes to be made to electronic drawing 112 are stored in redline file 118.

In a preferred environment, the present invention allows a user to see a depiction of electronic drawing 112 in the form of drawing representation 114. To the user, it appears as though changes are being made directly to electronic drawing 112. But changes are actually only being superimposed on top of drawing representation 114. After changes are completed, the redline file 118 is coupled together with either the electronic drawing 112 or a reference to electronic drawing 112 and sent to a draftsperson. A drafting workstation 120 receives the changes to be made embodied in redline file 118. A draftsperson can then open the actual electronic drawing 112.

The draftsperson makes the changes in electronic drawing 112 and then returns electronic drawing 112 to network storage device 110. Using the present invention the lag time from requesting a change to be made to having the change implemented can be drastically reduced, even to a matter of minutes.

Figure 2:
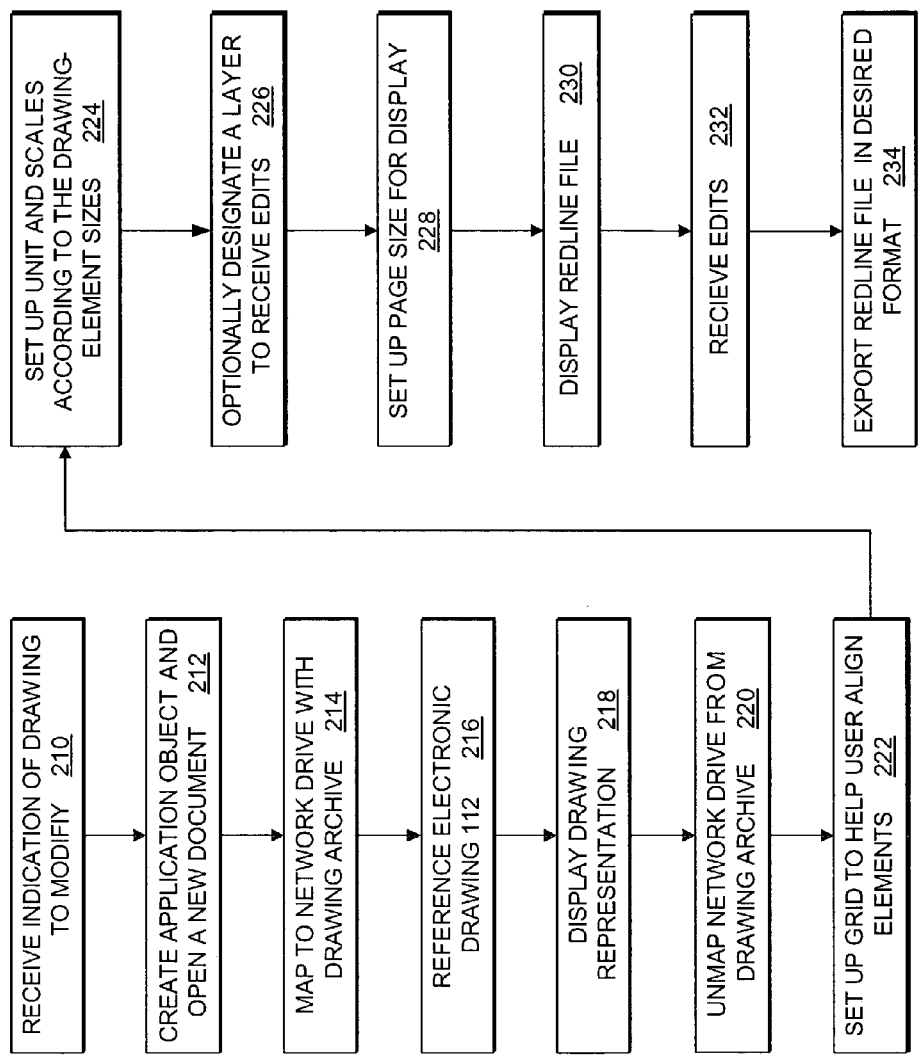
FIG. 2 is a flowchart describing the functionality availed by the present invention.

FIG. 2 provides a more detailed or alternative embodiment of the functionality offered by the present invention. At a step 210 the present invention receives an indication of a drawing to modify. Typically, a user selects a drawing stored in network storage device 110. In a preferred embodiment, a preview of the drawing is presented to the user before the actual drawing is opened. The present invention can be used in conjunction with a conventional drawing editor. An exemplary drawing-editor package includes ACTRIX® also offered by Autodesk, Inc.

At a step 212, an application object is created and associated with a new document. Creating an application object is but one method used to reference the name and location of the file to be opened. Preferably user-defined templates, customized features, and toolbars are associated with a specific drawing or drawing set. For instance, in a telecommunications environment, a template can be created that includes commonly used network devices.

At an optional step 214, a network drive is mapped to a drawing archive. The drawing representation 114 is then presented to a user at a step 218 by referencing electronic drawing 212. Drawing representation 114 can be presented in a variety of ways. In one embodiment, drawing representation 114 is a version of electronic drawing 212 but with limited editing capabilities. One method of limiting editing capabilities is to permit edits to be made only in certain layers of the electronic drawing 112. In one embodiment, edits are permitted and captured within a "markup layer." At an optional step 220, the network drive can be unmapped from the drawing archive.

At a step 222, a grid is set up to help users align elements. The grid is situated to coincide with the elements that currently appear on the actual drawing 112. Although drawing 112 itself will not be modified at this stage, drawing representation 114 depicts drawing 112 to a high degree. Moreover, in a preferred embodiment, drawing representation 114 is merely a read-only version of electronic drawing 112. Accordingly, drawing representation 114 will be visually identical to drawing 112. The grid will help users make changes and edits by optionally snapping drawing lines and images to the current elements that exist on drawing representation 114. Such a grid will help reduce errors associated with manually marking up drawings.

At a step 224, a unit system and scale system are set up according to the drawing unit and scale. For drawings that already contain elements, those elements are of a certain size or scale. The sale of the to-be-created redlined version 118 is set up to coincide with the scale associated with the drawing representation 114. Similarly, if the drawing elements of drawing 114 are in a certain unit, for instance feet or meters, the edits will also be made in the corresponding unit.

At a step 226, a user may designate one or more "red-line" layers. A "red-line" layer is a layer that will be used to mark edits. In one embodiment, changes are made in a designated, distinct layer. The present invention should not be construed as limited to situations where multiple layers are used. However, in a preferred embodiment, an administrator is able to customize or denote a certain layer upon which changes should be made within. Later, when the changes are included within drawing 112, the redlined layer can by turned on or off to ease incorporating the edits. At a step 228 the page size is set up for display. Thus, before redline changes are to be made, the page size is presented to a user in a format that is amenable to marking up drawing representation 114.

Redline file 118 is displayed at a step 230. In a preferred embodiment, the redline file 118 is displayed with drawing representation 114 in the background. As indicated below, the steps of FIG. 2 are not intended to provide a specific order of operation. Certain steps can be executed in an order other than that depicted. When the redline file is initially displayed or presented to a user, the user will not notice any changes on the display. The redline file remains empty until the user adds edits to drawing representation 114. Any changes that the user makes are incorporated within the redline file 118 and are maintained separately from the actual electronic drawing 112. Separation is transparent to a user. A user may not even realize that two separate files exist because the redline file 118 acts as an electronic overlay to drawing representation 114.

At a step 232, edits to be made to electronic drawing 112 are received. Although various methods exist for editing the drawing representation 114, one method or receiving edits is to receive the edits superimposed on top the underlying drawing represented by drawing representation 114. An exemplary method of superimposing edits is to receive the edits in a layer distinct from the layer in which the original electronic drawing data is stored. Editing the drawing includes making changes, additions, or deletions that will eventually be incorporated within electronic drawing 112.

An administrator can restrict how changes are to be made to a drawing. For instance, additions may be confined to the color green. If additions are to be made in green, then the present invention can be configured to provide an icon or button associated with making additions. When a user selects the "additions" button, any changes made will be made in green. Similarly, deletions can be restricted to being made in the color yellow. If a user needs to make a deletion, he or she may select the "delete" button and have any changes made from that point forward done in the color yellow. A user is also allowed to create freestyle text or callout balloons to describe changes to be made.

After the user denotes all changes to be made, the redline file is exported in a desired format at a step 234. This desired format could correspond to the file format associated with application of the original electronic drawing 112. For instance, if drawing 112 was created using AUTOCAD®, then the redline file could be exported in a .DWG file format. From this point forward, a user can associate the redline file 118 with the electronic drawing 112. A user can then communicate the changes to be made vis-à-vis the redline file to a draftsperson. In one embodiment of the invention an e-mail can be composed including both the redlined file 118, or a reference thereto, and a reference to electronic drawing 112. This e-mail is sent to a draftsperson.

The draftsperson can then electronically receive the redline file 118 (or a reference) along with a reference to the drawing 112. The draftsperson can then retrieve the actual electronic drawing 112 and make edits to drawing 112 according to the redline file 118.

Using the present invention, no one needs to pull a physical copy of the drawing to modify. The actual locations of the drawings become irrelevant. Mark-up methodologies can be easily implemented via coding the requirements into the present invention. The draftsperson receives clear and concise editing instructions. The present invention also contemplates automatically incorporating the changes of the redline file 118 directly into drawing 112.

Although those skilled in the art will appreciate that the present invention can be embodied in a variety of computer application forms or programming languages, in a preferred embodiment the present invention is written in VISUAL BASIC®. The present invention, however, should not be construed to be limited in any way to a VISUAL BASIC® application but rather is merely a preferred embodiment.

Figure 3:
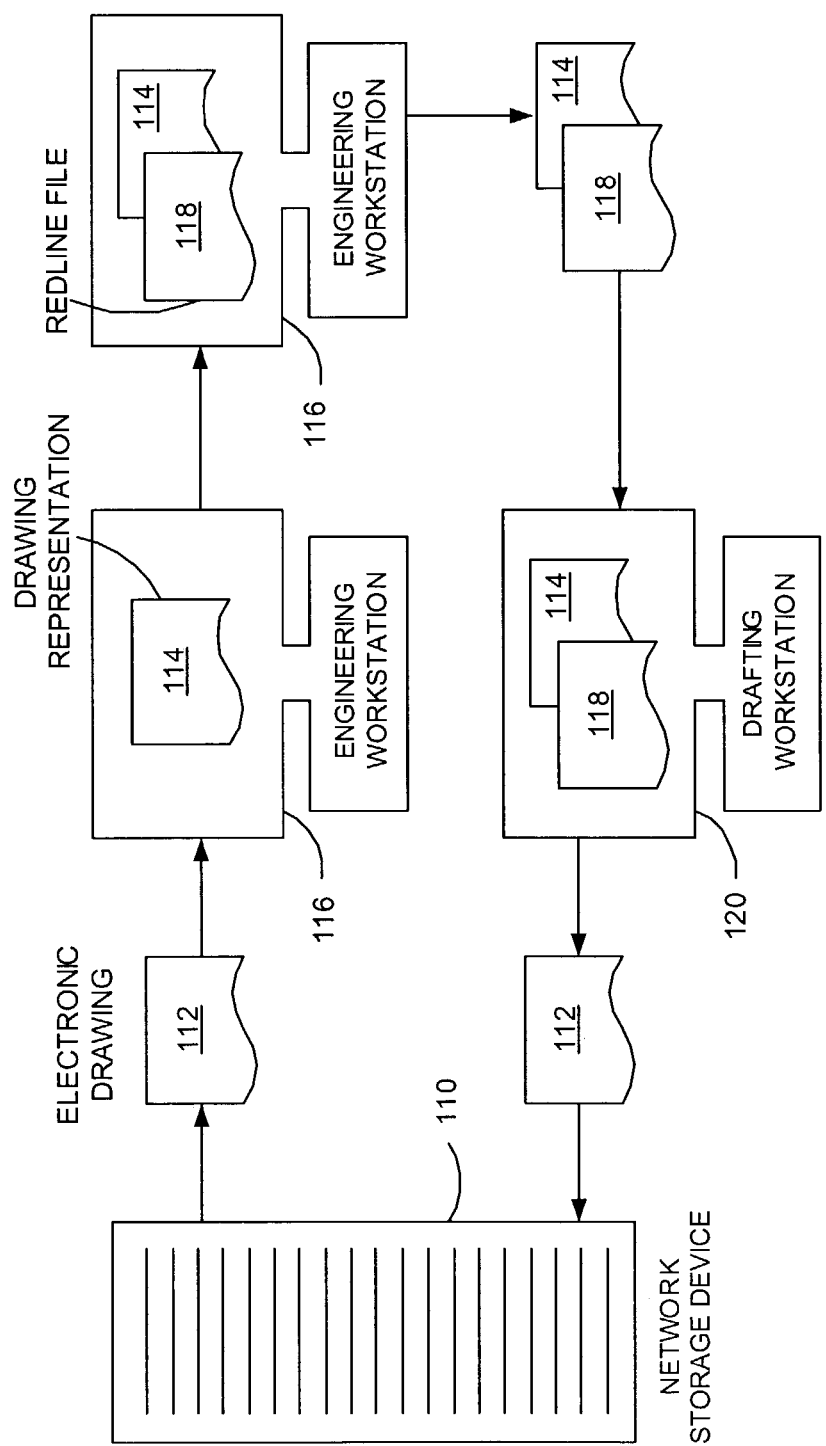
FIG. 3 is a block diagram depicting an alternative operating environment for practicing the present invention.

As can be seen, the present invention and its equivalents are well-adapted to provide a new and useful method for efficiently determining a least-cost routing path to communicate international data traffic. Many different arrangements of the various components depicted, as well as components not shown, are possible without departing from the spirit and scope of the present invention. For instance, FIG. 3 illustrates an alternative exemplary operating environment and method for practicing the present invention whereby drawing representation 114 is coupled with redline file 118 and the presented on drafting workstation 120.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the resent invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-storage media having computer-useable instructions embodied thereon for updating an electronic drawing comprising:
   instructions for presenting a representation of an uneditable version of the electronic drawing, wherein presenting the representation of said uneditable version of the electronic drawing further comprises the following:
      automatically defining a unit measurement associated with future edits,
      automatically defining a scale associated with future edits whereby additions made to the electronic drawing are made at the same scale as the electronic drawing,
      automatically defining a layer associated with future edits whereby additions made will be captured in said layer, and
      providing a customized template that includes a set of user-defined icons, wherein edits can be made to said electronic drawing by dragging said icons onto said representation;
   instructions for receiving edits to said electronic drawing, wherein said edits are layered and do not modify the electronic drawing; and
   instructions for storing said layered edits separate from said electronic drawing.

2. The media of claim 1, wherein the uneditable version includes at least one of the following:
   an image of the electronic drawing;
   a read-only version of the electronic drawing; and
   a digital underlay of the electronic drawing.

3. The media of claim 2, wherein instructions for receiving edits comprises instructions for receiving changes, additions, or deletions to said electronic drawing.

4. The media of claim 3, wherein instructions for storing said edits includes associating said edits with said electronic drawing.

5. The media of claim 4, further comprising instructions for automatically incorporating said edits into said electronic drawing.

6. Communicating the instructions of claim 1 across a computer network, wherein said computer network includes at least a selection from the following: the Internet, the World Wide Web, a local area network, a home network, a wide area network, a public network, a private network, and a wireless network.

7. An improved computer-aided-design (CAD) program that includes the instructions of claim 1.

8. In a computer-networking environment, a method for editing an electronic drawing, comprising:
   opening a representation of said electronic drawing, wherein opening the representation of said electronic drawing further comprises the following:
      automatically defining a unit measurement associated with future edits,
      automatically defining a scale associated with future edits whereby additions made to the electronic drawing are made at the same scale as the electronic drawing,
      automatically defining a layer associated with future edits whereby additions made will be captured in said layer, and
      providing a customized template that includes a set of user-defined icons, wherein edits can be made to said electronic drawing by dragging said icons onto said representation;
   superimposing edits onto said representation; wherein superimposing edits includes receiving edits in a designated drawing layer without modifying said electronic drawing; and
   saving said edits in a redline file, wherein said redline file is separate from said electronic drawing.

9. The method of claim 8, wherein said representation of said electronic drawing includes at least one or more of the following:
   the electronic drawing;
   a version of the electronic drawing with limited editing capabilities;
   a read-only version of the electronic drawing; and
   an noneditable image of the electronic drawing.

10. The method of claim 9, wherein opening a representation of said electronic drawing includes opening a user-defined template of useable shapes to simplify marking up said representation.

11. The method of claim 8, wherein superimposing edits onto said representation includes making changes, additions, or deletions on top of said representation without modifying said electronic drawing.

12. The method of claim 11, wherein said redline file comprises the changes to be made to said electronic drawing.

13. The method of claim 12, further comprising:
opening said electronic drawing;
opening said redline file; and
incorporating the edits of said redline file into said electronic drawing.

14. A computer system programmed to perform the method of claim 8.

15. In a computer-networking environment, a method for editing an electronic drawing, comprising:
presenting a representation of said electronic drawing, wherein presenting the representation of said electronic drawing further comprises the following:
automatically defining a unit measurement associated with future edits,
automatically defining a scale associated with future edits whereby additions made to the electronic drawing are made at the same scale as the electronic drawing,
automatically defining a layer associated with future edits whereby additions made will be captured in said layer, and
providing a customized template that includes a set of user-defined icons, wherein edits can be made to said electronic drawing by dragging said icons onto said representation;
receiving edits to said representation, wherein receiving edits to said representation includes receiving layered indications of changes to be made to said electronic drawing without modifying said electronic drawing; and
storing said edits in a first file separate from said electronic drawing.

16. The method of claim 15, wherein said changes comprise at least one of an addition or modification to, or deletion from, said electronic drawing.

17. The method of claim 16, wherein storing said edits comprises embodying said edits on one or more computer-storage media.

18. One or more computer-storage media having computer-useable instructions embodied thereon for carrying out the method of claim 15.

19. The method of claim 15, further comprising automatically incorporating said edits into said electronic drawing.

20. The method of claim 15, wherein presenting a representation of said electronic drawing comprises one or more selections from the following:
presenting the electronic drawing;
presenting a version of the electronic drawing;
presenting an image of the electronic drawing;
presenting the electronic drawing with limited editing functionality; and
presenting the electronic drawing in a read-only format.

* * * * *